United States Patent [19]
Fisher, Jr. et al.

[11] Patent Number: 5,954,474
[45] Date of Patent: *Sep. 21, 1999

[54] HYDRO-TURBINE RUNNER

[75] Inventors: Richard K. Fisher, Jr., Jacobus; Robert G. Grubb, York; Joseph M. Cybularz, Jacobus; Richard K. Donelson, Emigsville; Mark E. Kennell, Dallastown; Wolfgang Heine, York, all of Pa.

[73] Assignee: Voith Hydro, Inc., York, Pa.

[*] Notice: This patent is subject to a terminal disclaimer.

[21] Appl. No.: 08/800,240

[22] Filed: Feb. 12, 1997

Related U.S. Application Data

[63] Continuation-in-part of application No. 08/623,245, Mar. 28, 1996.

[51] Int. Cl.$^6$ ............................... F03B 3/06; F03B 3/18; F03B 15/10; F03B 15/14
[52] U.S. Cl. ............................... 415/17; 415/13; 415/24; 415/33; 415/36; 415/42; 416/168 A; 416/174; 416/239; 416/244 A; 416/245 A; 29/889.2
[58] Field of Search ............................... 415/13, 17, 24, 415/33, 36, 41, 42, 1; 416/31, 36, 37, 43, 44, 46, 48, 168 R, 168 A, 174, 223 R, 223 A, 239, 244 A, 244 B, 243, 245 R, 245 A, DIG. 5; 440/50, 71, 73; 29/889.1, 889.2, 889.21

[56] References Cited

U.S. PATENT DOCUMENTS

| | | |
|---|---|---|
| 1,901,773 | 3/1933 | Pfau . |
| 2,090,093 | 8/1937 | Andrews .............................. 416/174 R |
| 2,290,666 | 7/1942 | Ashelman et al. . |
| 2,378,958 | 6/1945 | Troller . |
| 2,382,535 | 8/1945 | Bauer . |
| 2,470,517 | 5/1949 | Obrist . |
| 2,498,072 | 2/1950 | Dean . |
| 2,776,107 | 1/1957 | Willi . |
| 3,822,104 | 7/1974 | Poet . |
| 4,174,137 | 11/1979 | Ferris .................................. 416/168 A |
| 4,419,053 | 12/1983 | Swearingen, Jr. .................. 416/245 R |
| 4,453,887 | 6/1984 | Schucker . |
| 5,209,640 | 5/1993 | Moriya . |
| 5,226,804 | 7/1993 | Do . |

FOREIGN PATENT DOCUMENTS

| | | |
|---|---|---|
| 59-115475 | 7/1984 | Japan . |
| 530104 | 11/1976 | U.S.S.R. ............................. 416/168 A |
| 1069627 | 5/1967 | United Kingdom ............... 416/168 A |

Primary Examiner—Christopher Verdier
Attorney, Agent, or Firm—Foley & Lardner

[57] ABSTRACT

A turbine, disposed in water flowing therethrough, includes a hub and associated runner blades. Each blade comprises an inner surface and a distal outer surface, a leading edge and a trailing edge separated by a water directing surface. Each blade is rotatable relative to the hub about a blade rotational axis. The hub includes a spherically-shaped outer surface in a region of the hub swept by the inner surface of the blades when the blades are rotated from maximum to minimum pitch. The hub may also be associated with blades in which the chord is reduced in the root region of the blade. The turbine may also include seals attached to the blade inner surface and an essentially spherically-shaped discharge ring to improve certain turbine parameters such as cavitation, efficiency, flow disturbance, and fish survivability.

24 Claims, 11 Drawing Sheets

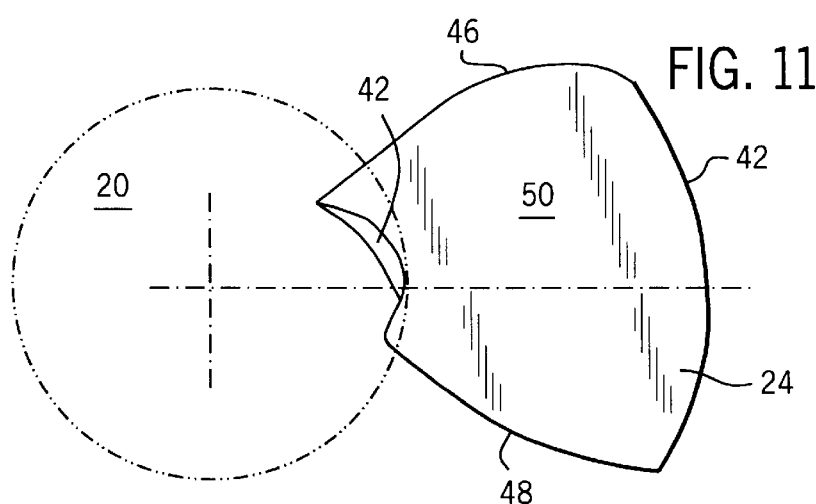
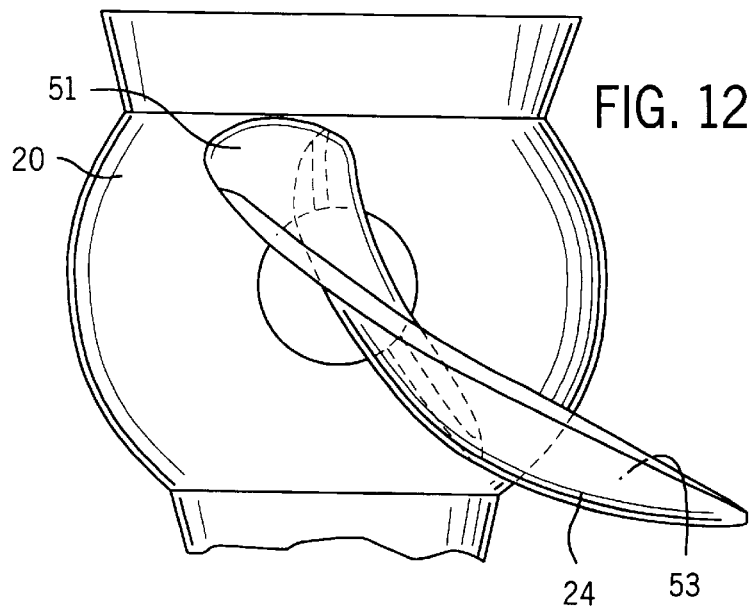
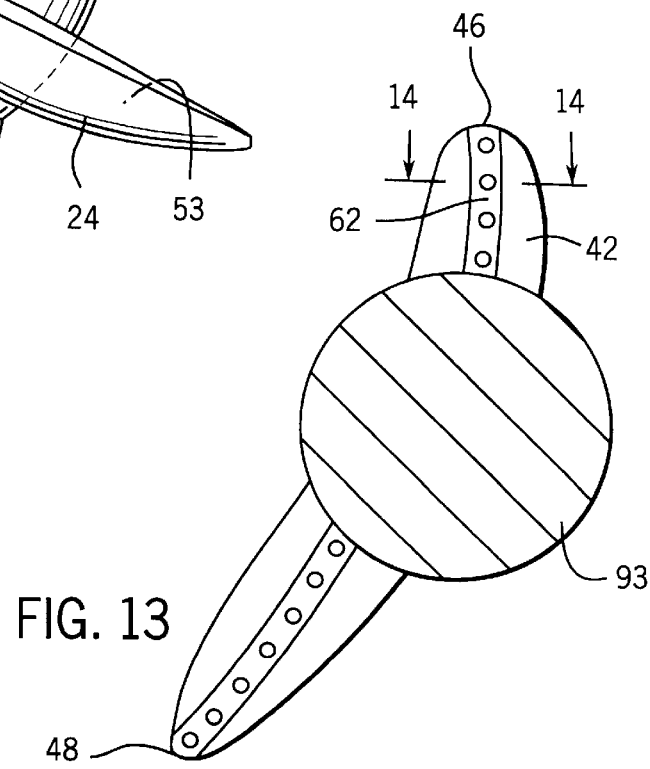

HYDRO-TURBINE RUNNER

CROSS-REFERENCE TO RELATED APPLICATIONS

This is a continuation-in-part application of co-pending U.S. patent application Ser. No. 08/623,245, filed Mar. 28, 1996.

FIELD OF THE INVENTION

The present invention relates generally to hydroelectric turbine installations. More particularly, this invention pertains to hydroelectric installations utilizing propeller-type turbines in which the angular position of the runner blades relative to the hub of the turbine or propeller, i.e. the pitch of the blades, is adjustable.

BACKGROUND OF THE INVENTION

Hydroelectric turbine installations in which the turbine comprises several runner blades having an adjustable pitch are widely used. In these turbines, each runner blade (often simply called a "blade"), is pivotally connected to the hub having a longitudinal axis, the blades typically including a trunnion which is rotatable about an axis extending in a direction generally perpendicular to the hub. The rotation of each blade about its axis permits the turbine operator to vary the amount of power produced and seek the optimum efficiency of the hydroelectric installation under the entire range of operating conditions of the turbine.

In the hydroelectric industry, the most common type of turbine with adjustable pitch blades is referred to as a "Kaplan" turbine in which the axis of rotation of the blades is substantially perpendicular to the hub longitudinal axis. In relatively few instances where this condition is not met, the turbine is called a "Deriaz" turbine. However, to facilitate the reading of this application, in the following we will simply discuss the present invention in connection with Kaplan turbines because the principles of operation and operating parameters of Deriaz turbines that are of interest to the invention are substantially the same as those of Kaplan machines.

Kaplan turbines are also typically provided with adjustable wicket gates designed to regulate the flow of water admitted to the turbine. Accordingly, for each point of operation of such a turbine there is an optimum gate opening and blade opening condition that maximizes power output for the amount of flow passing through the turbine.

It is well recognized that hydroelectric power generation is generally socially more desirable than its counterparts which obtain energy from the combustion of fossil fuel or the fission or fusion of atoms. It is also widely accepted that Kaplan turbines materially improve the efficiency of hydroelectric installations. However, it is increasingly being suspected that certain Kaplan installations have various detrimental impacts on the environment, particularly on the fish population which is present in the water flowing through the turbine.

One of these potentially adverse impacts results from the very features of Kaplan turbines that increase the efficiency of hydroelectric installations using these turbines, namely the adjustable blades. Specifically, in a Kaplan turbine having its main axis generally parallel to the direction of the flow of water passing through the turbine, the pitch of the blades is adjustable from maximum to minimum blade opening or pitch, the blade forming a greater impediment to the flow of water when it is in the minimum pitch position (i.e., when the face of each blade is substantially perpendicular to the water flow).

Prior art Kaplan turbines are commonly provided with a frusto-spherical hub, i.e., in which the portion of the hub extending between two parallel planes passing through the intersection of the radiating lines R and the hub, is spherically-shaped as illustrated in FIGS. 2–5. In other words, and as more particularly shown in FIGS. 2 and 4, in such Kaplan turbines the surface region of the hub swept by the blades as the blades are moved between maximum and minimum pitch is not fully spherical. In that case, the blade inner surface conforms to the shape of the hub when the blade is at maximum pitch. However, gaps (often wedge-shaped) form between the blade inner surface and the hub surface as the blade departs from the maximum pitch position. A similar situation occurs in cases where the blade inner surface extends beyond the substantially spherical portion of the hub falling between the lines radiating from the hub center. Consequently, in both of these cases the surfaces of each blade facing the hub (i.e., the inner surface of each blade) do not fully conform to the outer surface of the hub over the entire range of blade positions. This means that as the blade departs from maximum pitch position (e.g., moving from position 5B to position 5A), a gap is formed between the hub and the blade edge, as more particularly illustrated in FIGS. 3 and 5.

Various studies have shown that gaps formed between the blades and the hub of a Kaplan turbine have several detrimental effects. First, such "detrimental" gaps (which are not to be confused with the functional clearances established between relatively movable part, such as for example clearance δ shown in FIG. 9A existing between the hub outer surface and the inner surface of the blade for suitable movement of the blades relative to the hub) formed between the hub and certain regions of the blades cause efficiency losses. This is because water leaking through such gaps typically lessens the ability of the blades to extract energy from the flow of water passing through the turbine. As can be readily appreciated, runner blades are configured so that water impinging thereon causes rotation of the runner to transform rotation of the runner into electrical energy. Water leaking through a gap therefore reduces the amount of water available to generate electrical energy, thereby reducing the efficiency of the turbine installation.

Furthermore, water leakage through a gap results in high turbulence and may also cause a phenomenon known as cavitation. As is well known in the art, cavitation occurs when components of the water flow move into regions of relatively low static pressures in the flow of water. Cavitation manifests itself by the production of bubbles of water vapor in low pressure regions of the water flow. When these bubbles of water vapor enter regions of higher pressure, they implode thereby causing damage (in the long run) to nearby structures such as the runner blades. As is well understood by those skilled in the art, a gap between the hub surface and the blade typically promotes cavitation. This is because the gap puts the high pressure side of the blade in fluid communication with its low pressure side (i.e., the suction side), potentially creating intense vortices which cause an undesirable cavitation condition.

In addition to efficiency losses and cavitation problems, gaps also form a trap for fish which are present in the water flowing through the turbine. It is believed that fish flowing into such gaps have a significantly greater chance of being injured or killed than fish flowing through other regions of the turbine. Recent efforts have therefore been undertaken to address the apparent propensity of Kaplan turbines to injure fish.

In particular, systems have been designed to divert fish away from Kaplan turbines. These systems include screens to keep fish out of the turbine, or structures configured to divert fish away from the turbine. It can be readily appreciated, however, that these prior art structures have several shortcomings. First, systems of the type necessitating separate structures consume some of the water normally flowing through the turbine thereby reducing the energy produced by the turbine installation. Second, it has been found that these systems are not fully effective to divert the entire fish population away from the turbine and may cause mortality to the fish. In addition, screens disturb the water flow and cause efficiency losses within the turbine. Finally, as can be readily appreciated, these additional structures, which in addition to not being entirely satisfactory, materially increase the cost of hydroelectric installations using Kaplan turbines.

Generally, various attempts have also been made to increase the efficiency of adjustable pitch propellers and turbines by reducing the gap formed in these mechanisms. For example, U.S. Pat. No. 2,498,072 issued Feb. 21, 1950 to Dean discloses an aircraft propeller in which the pitch of the blades is adjustable. To reduce air turbulence and drag in the region of the gap formed at the base of the blade, a seal made of molded rubber is attached to the hub embracing the blade airfoil.

More specifically, other attempts have been made to optimize the efficiency/cavitation ratio of Kaplan turbines and of hydro-electric turbines of other types. For example, U.S. Pat. No. 5,226,804 issued Jul. 13, 1993 to Do discloses a propeller-type runner in which the blades are fixed in position relative to the hub. The leading edge of each of the blades includes an enlarged forward region projecting toward the trailing edge of the immediately preceding blade. As noted in Do, it has been found that such a blade configuration reduces cavitation and produces superior torque.

Still another example of an approach used to improve the operating characteristics of certain rotating bladed implements is found in air fans, and in particular in axial flow fans having adjustable blades as disclosed in U.S. Pat. No. 2,382,535 issued on Aug. 14, 1945 to Bauer. In Bauer, to improve the efficiency of the fan, the fan is provided with a substantially spherically-shaped wheel periphery and a annular recess formed opposite the tip of the blades. The close tolerance between the wheel and the blades and the blades and the recess generally improves the efficiency of the fan.

The foregoing indicates that various attempts have been made to increase the efficiency of air propellers, fans, and Kaplan turbines. However, in view of the diverse detrimental effects resulting from the formation of gaps between the blades and hub or the blades and passageway of Kaplan turbine, it seems desirable to provide effective ways to reduce the size of these gaps and thereby improve certain operating characteristics of Kaplan turbines without materially impairing others.

SUMMARY OF THE INVENTION

The present invention reduces the detrimental effects of gaps normally formed between the hub and blades of Kaplan turbines, particularly improving the survivability of fish present in water flowing through a turbine, reducing cavitation and turbulent leakage flow, and otherwise generally improving the efficiency of such turbines.

A turbine in accordance with one aspect of the present invention comprises a hub and associated blades. The angular position of each blade relative to the hub (i.e., the pitch of each blade) is adjustable. The turbine includes a spherical hub, the surface of each blade oppositely facing the hub substantially conforming to the surface of the hub so that a necessary functional clearance only is formed between these surfaces and the hub surface over the entire range of blade positions (i.e., from maximum to minimum pitch).

According to another aspect of the present invention, the chordal distribution of the blade is reduced in the region of the blade root, causing the inner surface of the blade to be effectively in contact with the hub spherical surface thereby reducing the gaps formed therebetween.

According to a further aspect of the present invention, a seal is attached to the inner surface of the blade to further reduce potentially detrimental effects of the functional clearance existing between the blade and the hub on the overall operation of the turbine.

According to another aspect of the invention, the turbine installation includes features configured to reduce gaps formed in other areas of the installation.

According to yet another aspect of the invention, a method is described to improve the survivability of fish passing through an existing turbine installation, reduce cavitation, and increase the efficiency of the turbine in connection with the rehabilitation of such installation.

Other advantages of the invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the invention will hereinafter be described in conjunction with the appended drawings, wherein like numerals denote like elements and:

FIG. 10 is an enlarged partial cross-sectional view of a portion of the leading edge of the blade taken along line 10—10 shown in FIG. 6;

FIG. 11 is a top plan view of a blade of the present invention showing the spherically-shaped inner surface of the blade;

FIG. 12 is a front elevational view of the hub and one associated blade in accordance with another embodiment of the present invention, showing a seal attached to the inner surface of the blade;

FIG. 13 is an enlarged side elevational view of the blade of FIG. 12 viewed from the inner surface end thereof, illustrating the seal attached thereto;

DETAILED DESCRIPTION OF A PREFERRED EXEMPLARY EMBODIMENT

The present invention relates generally to hydroelectric installations having turbines provided with features designed to reduce gaps formed between the hub and associated blades, and between the blade outer surfaces or tips and the discharge ring. Such features are configured to improve the survivability of fish present in water flowing through the turbines, reduce cavitation and flow disturbance, improve the efficiency of the turbine, or otherwise enhance the operation of the installation. The turbines are of the Kaplan-type in which several blades pivotally are connected to the hub. It should be understood, however, that the invention is applicable to any other type of turbine or propeller in which the blades are pivotally adjustable with respect to the hub.

Figure 1:
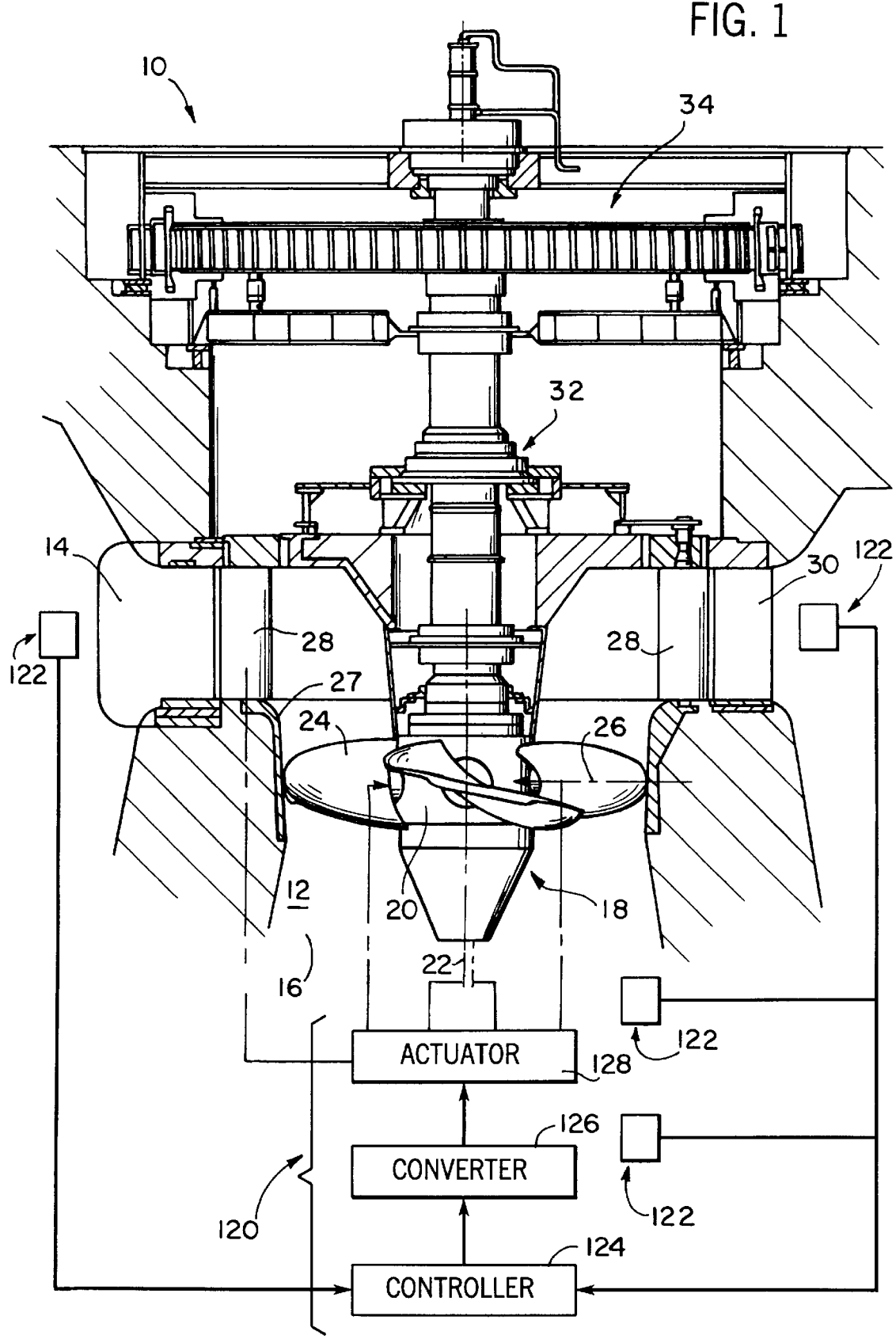
FIG. 1 is an elevational view, partially in cross section, of a hydroelectric installation including a turbine with adjustable blades.

Referring to FIG. 1, a hydroelectric turbine installation generally designated as 10 comprises a passageway 12, in which water flows from an upper elevation source in fluid communication with the upstream end 14 of installation 10, to a lower elevation discharge region 16. Installation 10 also includes a turbine runner 18 of the type comprising a hub 20 having a longitudinal axis 22, and a plurality of runner blades 24 pivotally connected to hub 20. Each blade 24 is movable about a rotational axis 26 extending in a direction generally perpendicular to longitudinal axis 22. While the present invention will be described with reference to turbine runner 18 in which longitudinal axis 22 is vertical as shown in FIG. 1, those skilled in the art will appreciate that the present invention is similarly applicable to turbines disposed horizontally or at any position deviating from the horizontal or vertical, depending on the particular configuration of passageway 12. Furthermore, axes of rotation 26 could instead be inclined relative to longitudinal axis 22 (as in "Deriaz" turbines) without in any way departing from the scope of the present invention.

Intermediate upstream end 14 and rotational axis 26 is disposed a discharge ring 27 which directs the flow of water from upstream end 14 toward turbine runner 18. Installation 10 includes a plurality of wicket gates 28, which may be adjusted in rotation to regulate the flow of water admitted to passageway 12, and stay vanes 30 which are designed to support the portion of installation 10 located above turbine 18, that is, the thrust bearing 32, generator 34, and associated control systems and components typically located in the power station, some of these systems constituting what is commonly known in the industry as the "governor".

Referring now more particularly to FIGS. 6–11, hub 20 comprises an upstream region 36 and a downstream region 38 located on the upstream and downstream sides of rotational axis 26, respectively. Turbine runner 18 also typically includes between 2 and 9 runner blades 24. However, in most of the Figures only one blade will be represented to facilitate the description of the present invention.

Figure 2:
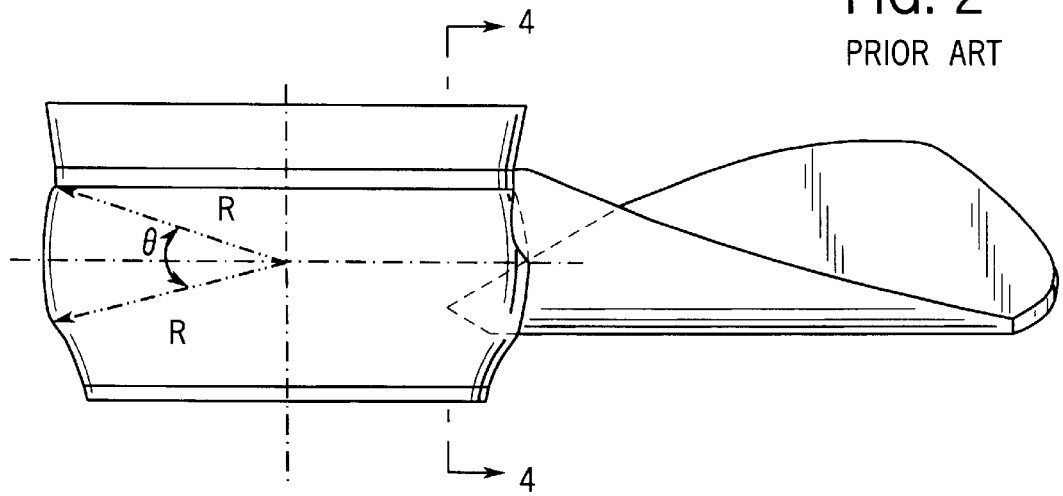
FIG. 2 is a partial schematic side elevational view of a Prior Art turbine runner.
Figure 7:
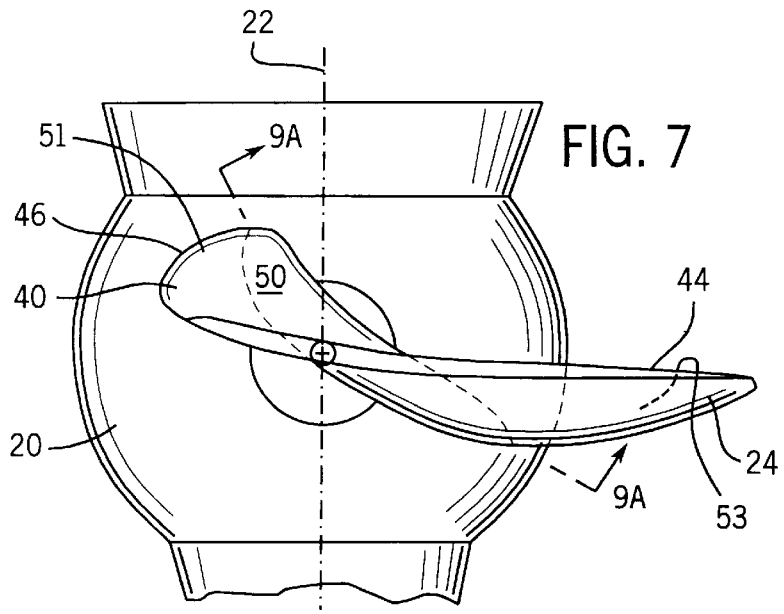
FIG. 7 is a front elevational view of the first embodiment shown in FIG. 6, the blade being shown at minimum pitch position.

Each blade 24 comprises a hydrofoil generally designated as 40 having an inner surface 42 and a distal outer surface 44, a leading edge 46 and a trailing edge 48 separated from leading edge 46 by a water directing surface 50 which comprises oppositely facing pressure and suction sides. For hydraulic considerations, hydrofoil 40 will usually be twisted as shown in FIG. 2 or 7. As a result, water directing surface 50 can be characterized as having an inner portion 51, extending from inner surface 42, merging into an outer portion 53 extending to outer surface 44.

Figure 8:
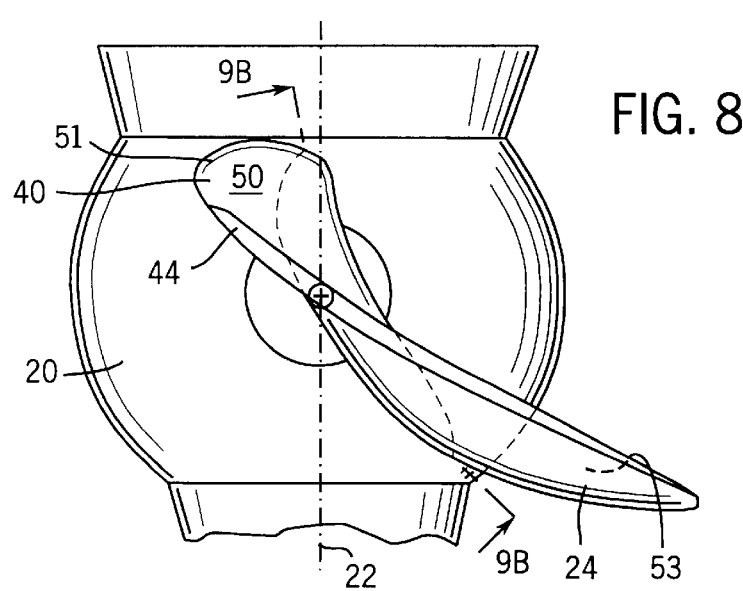
FIG. 8 is a front elevational view of the first embodiment shown in FIG. 6, the blade being shown at maximum pitch position.

Blade 24 is disposed for rotational movement relative to hub 20 with its inner surface 42 spaced from the outer surface 52 of hub 20 by functional clearance 6. As more particularly shown in FIG. 18, hub 20 is generally hollow, the hollow cavity 54 being defined by an inner surface 56 which is spaced apart and oppositely faces outer surface 52. As will be explained below, cavity 54 conveniently houses the various mechanisms, linkages and other systems necessary for the rotation of blades 24 about axes 26. When blade 24 is at minimum pitch position (shown in FIG. 7), outer portion 53 of water directing surface 50 forms a significant impediment to the water flowing through passageway 12. Toward maximum pitch position (as illustrated in FIG. 8), inner portion 51 of water directing surface 50 points in a direction generally parallel to longitudinal axis 22. In other words, blade 24 is "flatter" at minimum pitch position than it is at maximum pitch position.

Figure 4:
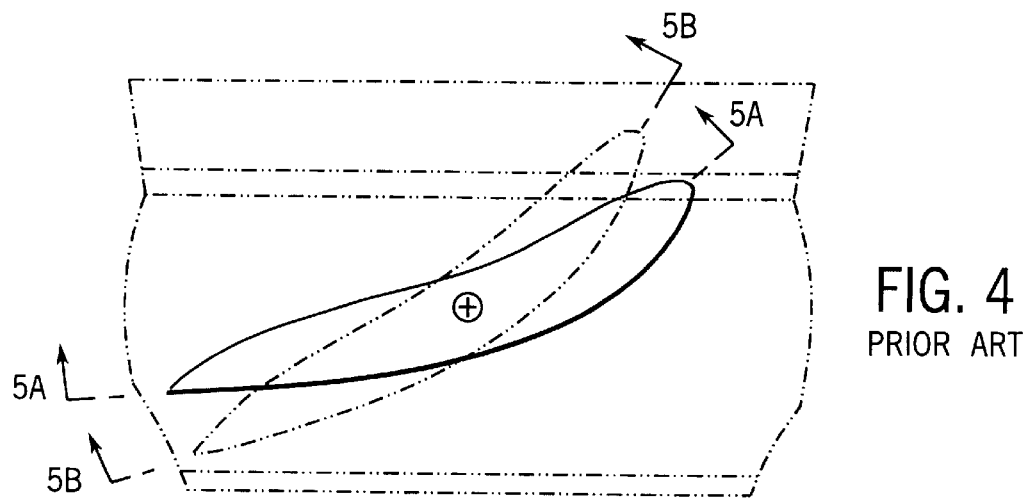
FIG. 4 is a partial schematic front elevational view of the Prior Art turbine runner of FIG. 2 showing two blade positions.

In a first embodiment of the present invention, outer surface 52 of hub 20 swept by inner surfaces 42 of blades 24 during rotation of blades 24 from maximum to minimum pitch is spherically shaped forming a spherical frustum comprising an upstream region 36 and a downstream region 38. Comparing FIG. 6 to a prior art hub illustrated in FIG. 4, it can be readily appreciated that the included angle Θ formed between the two radiating lines R is substantially greater in the case of the present invention than in prior art hubs. Typically, in this first embodiment of the present invention angle Θ will be at least 15% larger.

Figure 3:
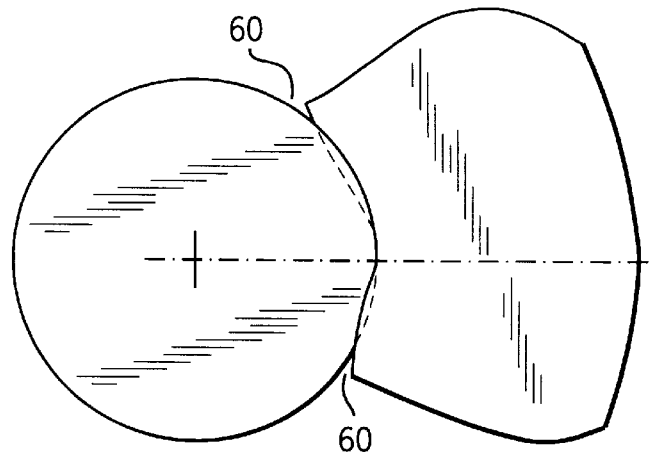
FIG. 3 is a schematic top plan view of the Prior Art turbine runner of FIG. 2, the adjustable blade shown at minimum pitch position.
Figure 5A:
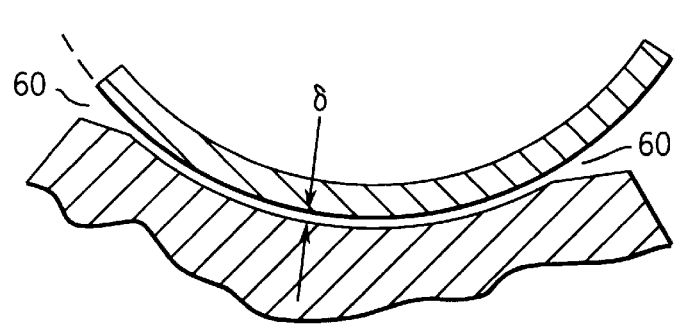
FIG. 5A is a partial schematic cross sectional view taken along line 5A—5A shown in FIG. 4, illustrating a gap formed between the blade and the hub (in the leading and trailing edge regions of the blade) at less than maximum pitch position of the blade.
Figure 5B:
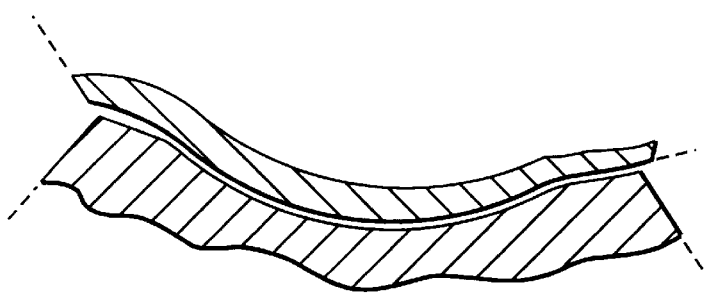
FIG. 5B is a partial schematic cross sectional view taken along line 5B—5B shown in FIG. 4, illustrating the reduced gap region between the blade and the hub (in the leading and trailing edge regions of the blade) at maximum pitch position of the blade.
Figure 9A:
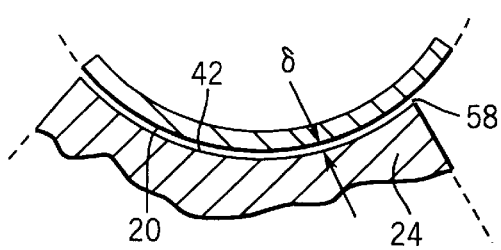
FIG. 9A is a partial schematic cross sectional view taken along line 9A—9A shown in FIG. 7, illustrating that, at less than maximum pitch position of the blade, the gap formed between the blade and the hub in the leading and trailing edge regions of the blade is limited to a functional clearance.
Figure 9B:
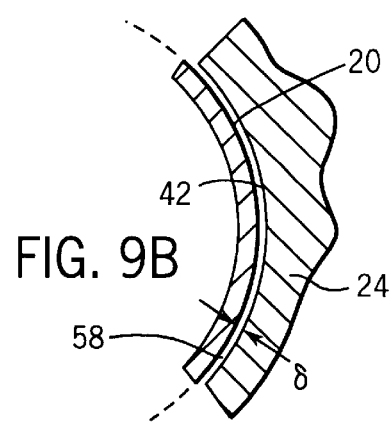
FIG. 9B is a partial schematic cross sectional view taken along line 9B—9B shown in FIG. 7, illustrating that, at maximum pitch position of the blade, the gap formed between the blade and the hub in the leading and trailing edge regions of the blade is also limited to a functional clearance.

Because the blade inner surfaces 42 are also spherically shaped and conform to hub outer surface 52, inner surfaces 42 will substantially conform to outer surface 52 over the entire range of blade positions, including at minimum pitch position, thereby limiting the gap 58 formed therebetween. As illustrated in FIGS. 9A and 9B, over the entire range of blade positions gap 58 remains substantially equal to functional clearance δ. Such an improved spherically-shaped hub therefore eliminates the large, essentially wedge-shaped gaps 60 typically formed between the hub and blades at blade pitch position other than maximum pitch position, as illustrated in FIGS. 3 and 5A which depict prior art hub configurations. Accordingly, as discussed earlier, the absence of large gaps 60 therefore reduces cavitation and flow disturbance, and improves turbine efficiency and fish survivability.

Typically, a blade inner surface 42 meets a water directing surface 50 along a relatively sharp edge. However, it is well known that sharp edges formed on runner blades create highly turbulent flows in regions of the water flow proximate such edges. Accordingly, the present inventors have also noted that in certain cases it may be possible to further improve some of these turbine parameters, and particularly the survivability of fish passing through turbine runner 18. Toward that end, the sharp edges of the juncture of inner surface 42 with inner portion 51 of water directing surface 50, at least in the region of leading edge 46, may be removed or softened as required depending on the extent of the overhang of the blade relative to the hub, or on the size of the gap formed between the blade and the hub. Such "rounded" configuration will typically reduce injury to the fish stricken by blade 24 during rotation of hub 20, and will further reduce flow disturbances in the region of such rounded edges.

Turning now to another embodiment of the present invention and referring more particularly to FIGS. 12–16, it has been found by the inventors that it is possible to reduce cavitation in Kaplan turbines and improve the efficiency of such turbine installations, while in both cases also improving the survivability of fish as they pass through the turbine, by further preventing water from flowing into gap 58. To that end, a second embodiment of the present invention includes a seal 62 attached to inner surface 42 of blade 24. Seal 62 projecting from inner surface 42 by a predetermined distance $d_1$, $d_2$, or $d_3$ depending on the size of gap 58 (see FIGS. 14–16), will effectively be in contact with outer surface 52 of hub 20 in upstream and/or downstream regions 36, 38, respectively, that are swept by blades 24 as they rotate about rotational axes 26.

Figure 14:
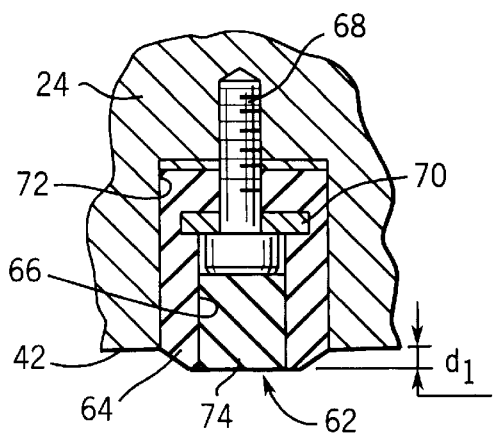
FIG. 14 is an enlarged partial cross sectional view taken along line 14—14 of FIG. 13, showing a first configuration of the blade seal.
Figure 15:
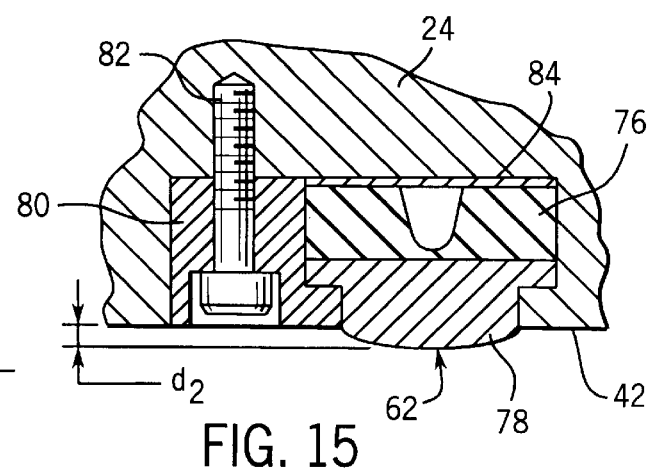
FIG. 15 is an enlarged partial cross sectional view taken along line 14—14 of FIG. 13, showing a first modified configuration of the blade seal.
Figure 16:
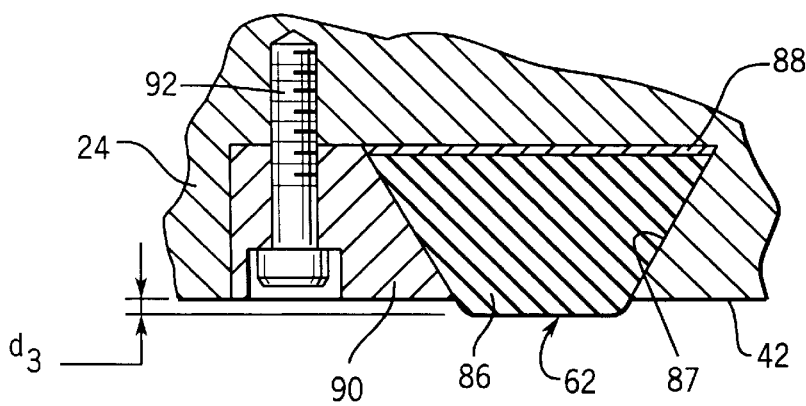
FIG. 16 is an enlarged partial cross sectional view taken along line 14—14 of FIG. 13, showing a second modified configuration of the blade seal.

Referring more particularly to FIGS. 14–16, seal 62 will be made of a corrosion-resistant or preferably corrosion-proof material (both being hereinafter generically referred to as corrosion-resistant materials) such as an elastomeric material, or an elastomeric material coated with a friction reducing material such as teflon. Seal 62 may also be made of a metal such as bronze (e.g., aluminum bronze), preferably forming a galling resistant combination with the material from which hub surface 52 is made. Seal 62, which is advantageously removably attached to inner surface 42 to facilitate its replacement after extended use or in the event it becomes damaged, can have one of several configurations. It can be formed as a continuous strip extending from the region of the axis of rotation of the blade to the leading or trailing edge of the blade. Instead, seal 62 may consist of a plurality of discrete strip portions.

Whether formed as a continuous strip or discrete sections, seal 62 can be attached to blade 24 in various ways. For example, as illustrated in FIG. 14, seal 62 which extends from inner surface 42 by a distance $d_1$ comprises a first portion 64 made of corrosion-resistant material and having a recess 66 configured to receive a fastener 68. Fastener 68 cooperates with a non-pliable insert 70 designed to evenly distribute the force applied by fastener 68 to retain first portion 64 into a mating recess 72 formed in inner surface 42. Seal 62 further includes a plug 74 made also of corrosion-resistant material filling cavity 66 and terminating at a point lying substantially at a distance $d_1$ from inner surface 42.

Alternatively and referring now to FIG. 15, seal 62 which extends from inner surface 42 by a distance $d_2$ may comprise a support portion 76 made of elastomeric material and disposed below a second portion 78 which is made of a corrosion-resistant material such as bronze or aluminum bronze. Seal 62 is removably attached to blade 24 by a suitably shaped retainer 80 cooperating with a fastener 82. If required, seal 62 may also include a non-pliable insert 84 to evenly support support portion 76.

Figure 16A:
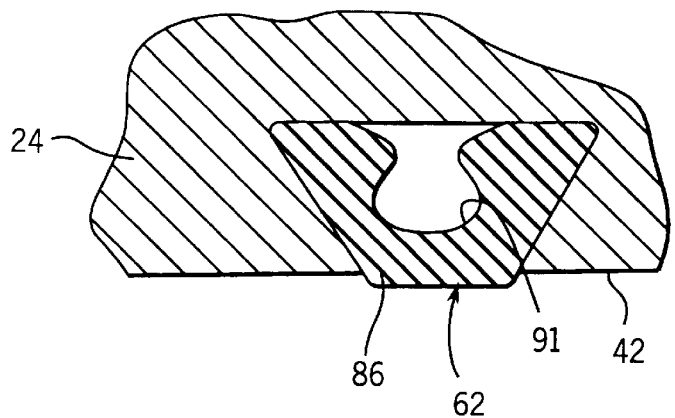
FIG. 16A is an enlarged partial cross sectional view taken along line 14—14 of FIG. 13, showing a third modified configuration of the blade seal.

A third embodiment of seal 62 is represented in FIG. 16 in which seal 62 extends from inner surface 42 by a distance $d_3$. In that case, the corrosion-resistant portion of seal 62 is configured as a truncated pyramid 86 received in a dove-tail groove 87 and supported by a non-pliable insert 88. Pyramid 86 is removably attached to blade 24 by a suitably shaped retainer 90 cooperating with a fastener 92. Alternatively and as shown in FIG. 16A, truncated pyramid 86 may include a cavity 91 to permit pyramid 86 to be squeezed for installation into groove 87. Once installed in the groove, cavity 91 is then filled with a curable liquid compound such as an elastomeric material to prevent pyramid 86 from become dislodged from groove 87. To permit removal of the seal when desired, groove 87 is advantageously provided proximate the blade leading and trailing edges 46, 48, as applicable, with a retainer such an expandable locking device designed to prevent slidable movement of pyramid 86 out of groove 87.

While any of the foregoing embodiments suitably prevents water from flowing into gap 58, in certain cases it may be possible to optimize this novel technique. For example, design considerations may permit reducing the length of gap 58, i.e., the distance separating the region of the axis of rotation of the blade from the leading or trailing edge of the blade. This can be achieved by enlarging palm 93 of blade 24 as shown in FIG. 13, and consequently the effective length of seal 62 can be decreased. Other considerations may lead to a reduction of the size of gaps 94 formed between the outer surface of the blades and the discharge ring. In those cases, another embodiment of the present invention may be used and will now be discussed referring more particularly to FIGS. 17 and 22.

Figure 17:
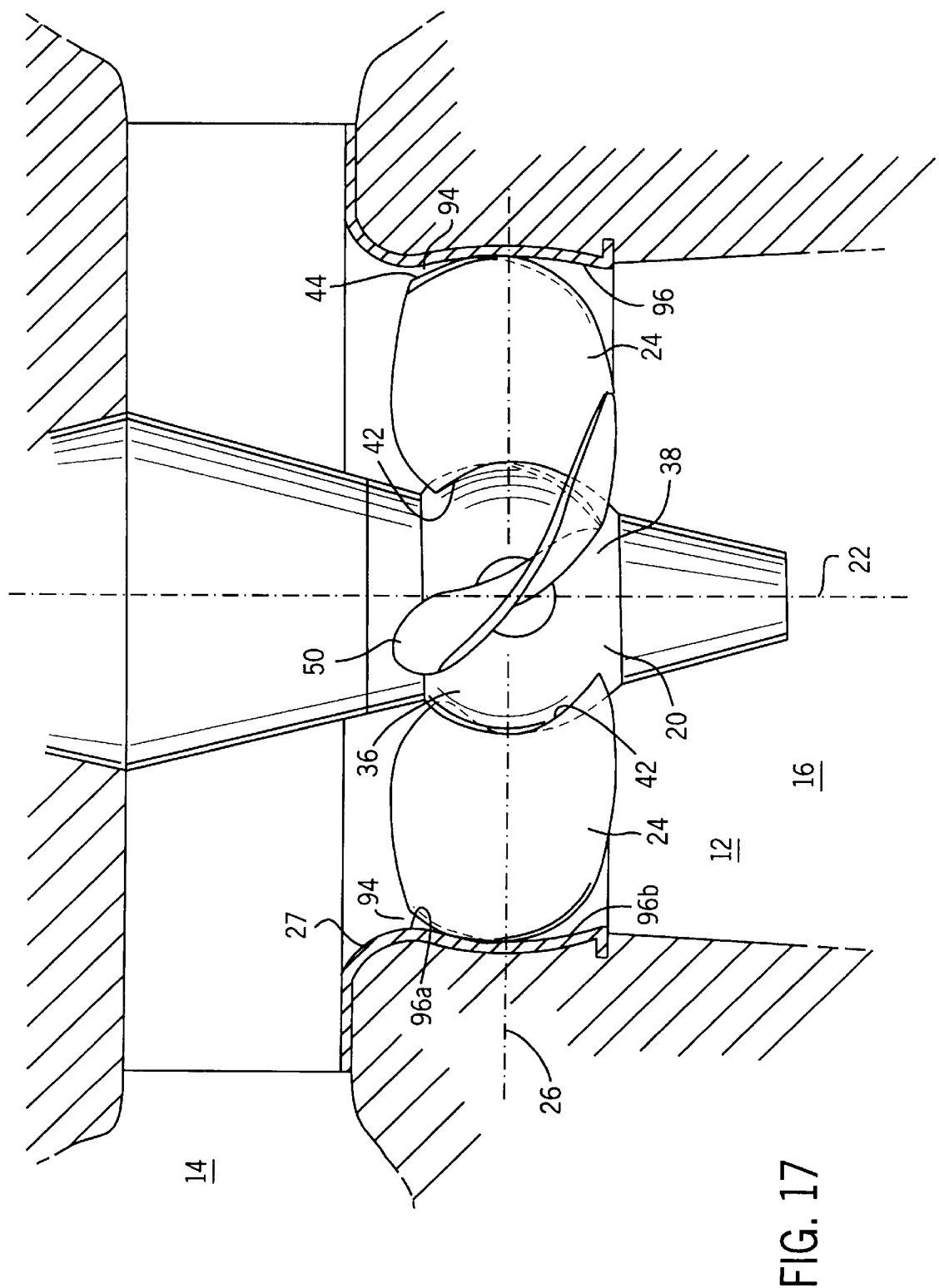
FIG. 17 is a partial front elevational view of the hub and blades in accordance with the present invention, the discharge ring regions of the turbine being shown in partial sectional view, illustrating the outer surfaces of the blades conforming to a spherically-shaped discharge ring.

Turbine installation 10 shown in FIG. 17 includes a discharge ring 27 disposed in a region of passageway 12 substantially facing the blades rotational axes 26. However, it has been recognized in the art of hydro-power generation that gaps formed between outer surface 44 and face 96 upstream of blade rotational axis 26 are detrimental to the operation and environmental impact of the turbine. To address this shortcoming, as illustrated in FIG. 17 wherein to facilitate this explanation discharge ring 27 is shown in cross-section and the blades and hub are shown three dimensionally, discharge ring 27 may have a substantially spherically-shaped face 96 oppositely facing and swept by outer surfaces 44 of blades 24. As a result, outer surfaces 44 substantially conform to face 96 as blades 24 are rotated about axes 26 preferably over the entire range of rotation of blades 24, and as turbine runner 18 rotates about longitudinal axis 22.

While it is preferable for outer surface 44 and face 96 to conform over the entire area swept by outer faces 44 both upstream and downstream of axis 26, in certain cases to achieve specified design and operating characteristics it may be sufficient to have a portion only of outer surface 44 conform to face 96. For example, it may be sufficient for face 96 to be spherically-shaped only over an area 96*a* extending upstream of axis 26 instead of having face 96 (i.e., areas 96*a* and 9*b*) substantially conform to outer surface 44. Alternatively, it may be acceptable for face 96 to be spherically-shaped only over an area 96*b* extending downstream of axis 26. Furthermore, it may also be acceptable for face 96 to be frusto-spherical, i.e., for selected portions only of areas 96*a* and/or 96*b* to be spherically-shaped. This configuration may cause a portion of outer surface 44 to extend beyond (in other words to overhang) spherically-shaped face 96, in the region of leading edge 46 and/or trailing edge 48, at certain pitch positions of the blades. We will now turn to FIG. 22 to discuss how these various discharge ring configurations affect the gap formed therebetween as the blade rotates about axis 26.

Figure 22:
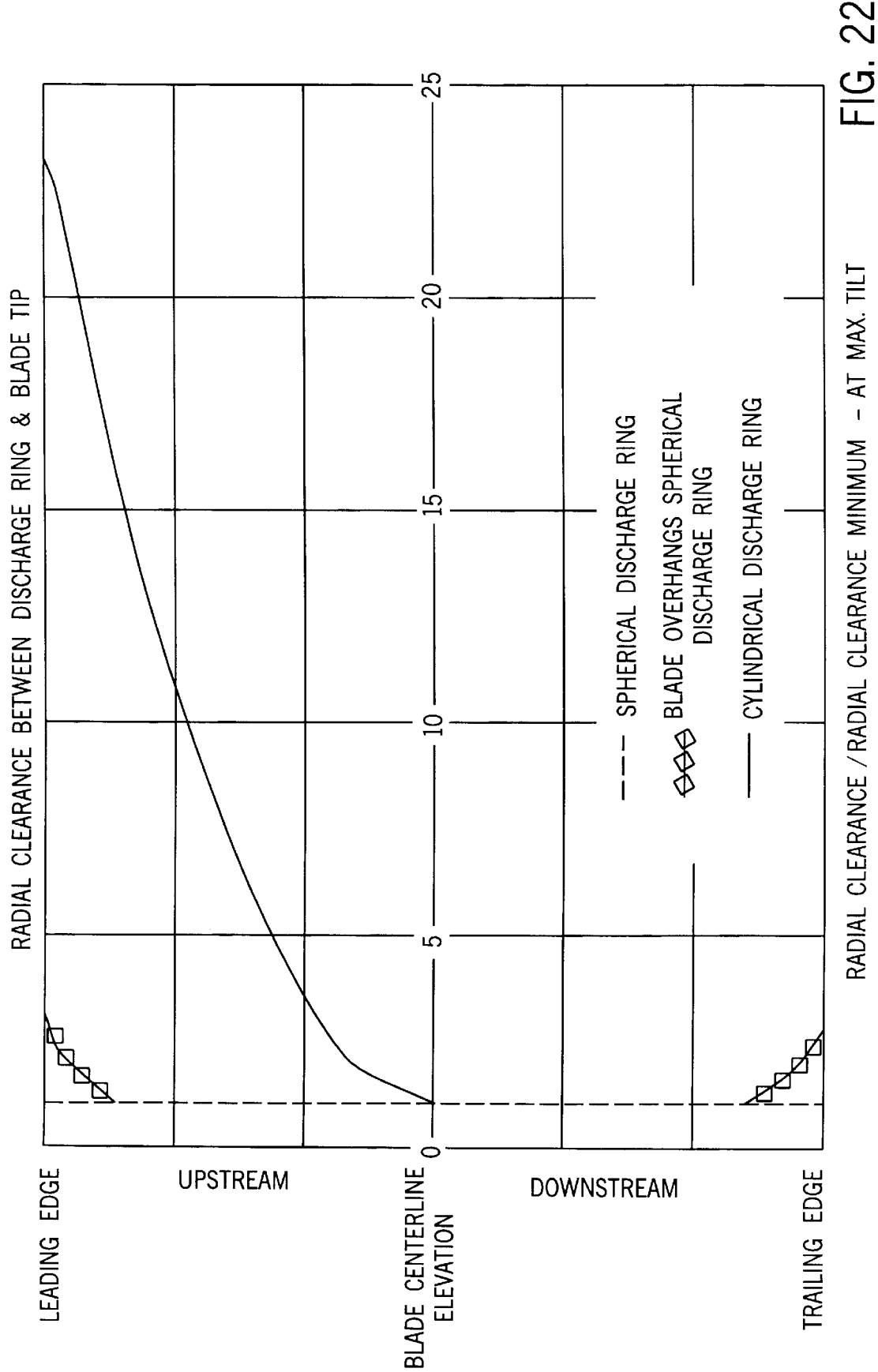
FIG. 22 is a graphical illustration of the variation of the clearance gap formed between the blade outer surface and the face of a discharge ring configured in accordance with a further aspect of the present.

FIG. 22 is a graphical representation at maximum blade tilt of the normalized variation of the radial clearance i.e., of the gap between the blade outer surface and the face of the discharge ring, for a blade/discharge ring combination of the present invention and two prior art blade/discharge ring configurations. In accordance with this other embodiment of the present invention, gap 94 is substantially equal to the functional clearance required between outer surface 44 and face 96 to permit blade tilting. In addition and significantly, the present embodiment causes gap 94 to remain essentially constant and equal to such functional clearance for all points along outer surface 44 upstream and downstream of rotational axis 26.

Because discharge ring 27 has an annular structure, face 96 closely conform with inner surfaces 44 all around discharge ring 27. In such an embodiment of the present invention, leakage losses are materially reduced as gaps 58 and 94 are minimized by the cooperation of oppositely facing spherically-shaped surfaces, specifically, by the close conformance of blade inner surface 42 with hub outer surface 52, and blade outer surface 44 with discharge ring face 96. This will result in reduced cavitation, reduced injury to fish passing through the turbine, and improved efficiency of the turbine installation.

Figure 19A:
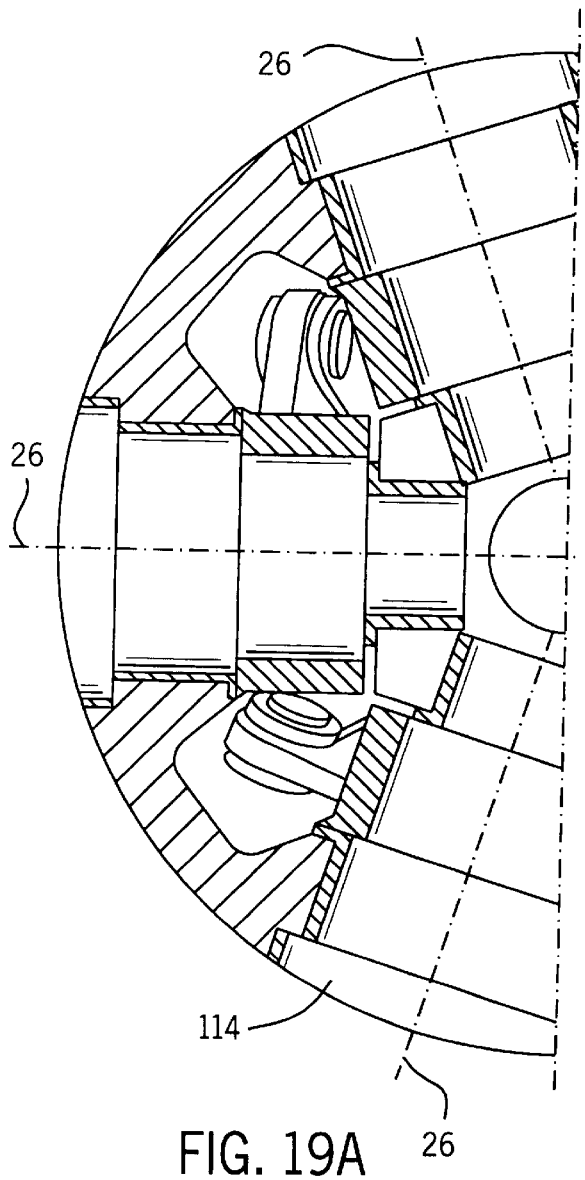
FIG. 19A is a partial sectional view of the spherically-shaped hub and angled linkage taken along line 19A—19A of FIG. 18.
Figure 19B:
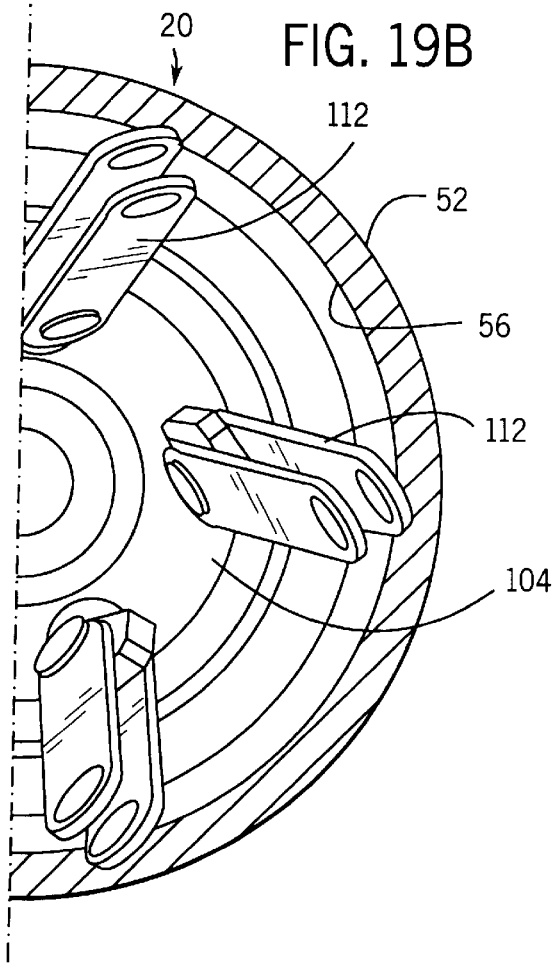
FIG. 19B is a partial sectional view of the spherically-shaped hub and linkage mechanism taken along line 19B—19B of FIG. 18.
Figure 20:
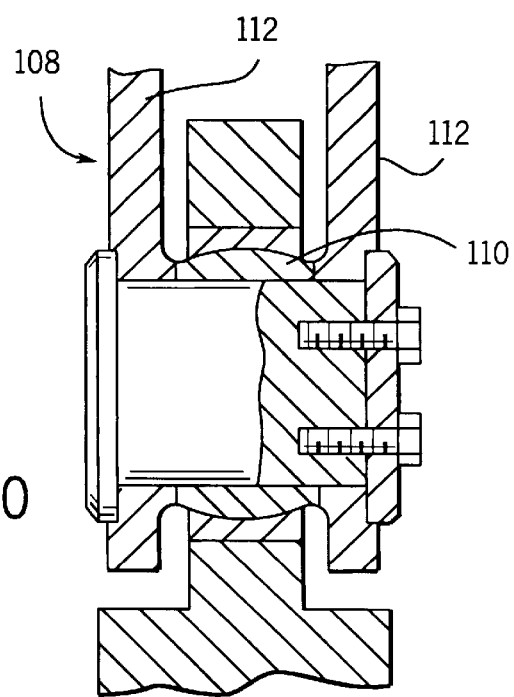
FIG. 20 is an enlarged partial sectional view of a portion of the angled linkage taken along line 20—20 of FIG. 18.

In certain cases, space inside the hollow hub becomes a dominant consideration. A further embodiment of the present invention addressing such a situation will now be discussed referring more particularly to FIGS. 18–20. In that case, a linkage mechanism generally designated as 100 is received in hollow hub 20 and connects blades 24 to a drive mechanism 102 (not shown) for rotation of blades 24 about rotational axes 26. Drive mechanism 102 may consist of one or several servo-motors, hydraulic cylinder(s), or hydraulic motor(s). Drive mechanism 102 is connected to a piston head 104 to which linkage mechanisms 100 are removably connected. In response to an appropriate command sent to drive mechanism 102, piston head 104 is displaced within chamber 106, thereby causing rotation of blades 24 about axes 26.

Figure 18:
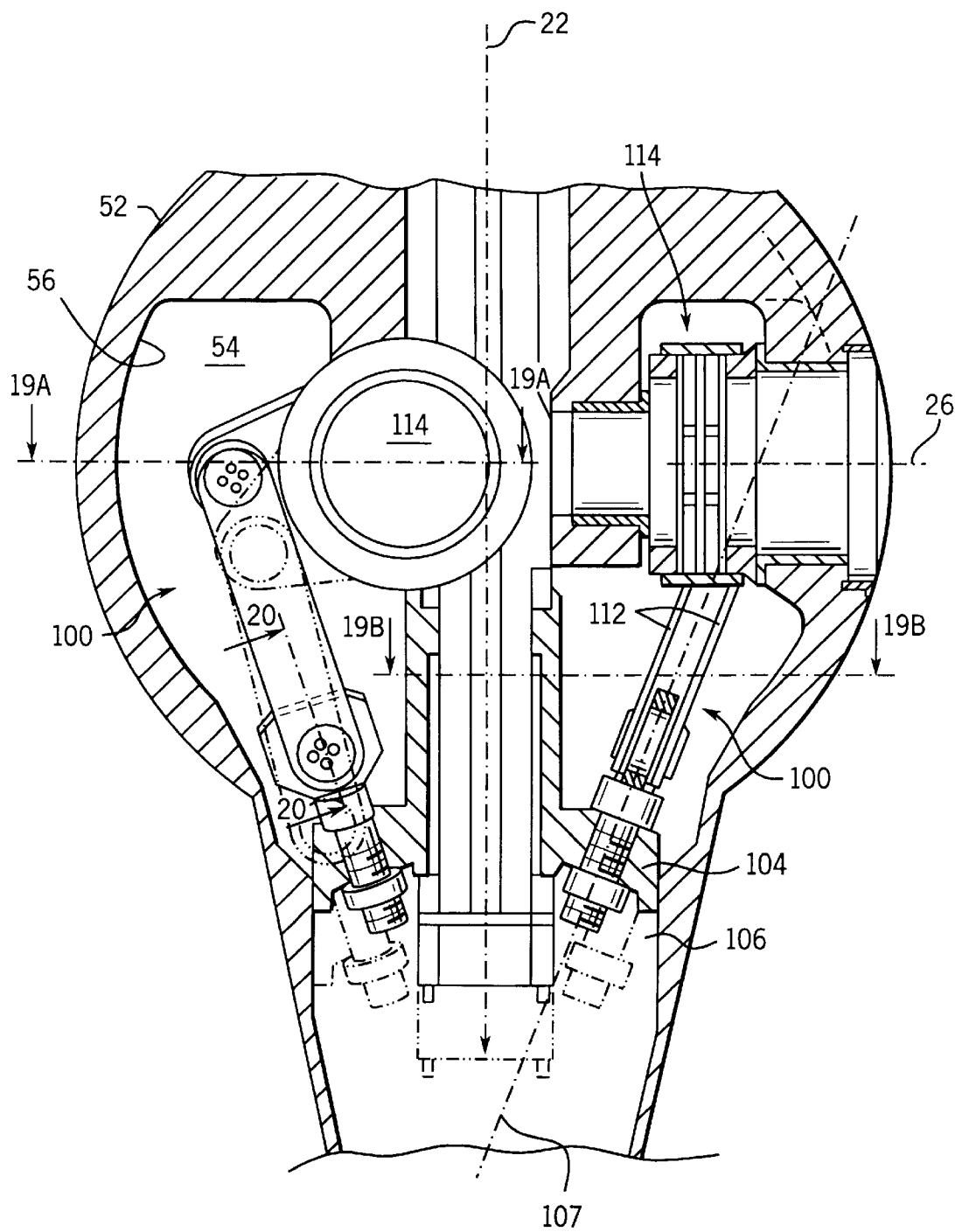
FIG. 18 is a partial sectional view along one of the blades rotational axis of a spherically-shaped hub in accordance with another embodiment of the present invention, showing the angled linkage connecting the blades to the blade positioning mechanism.

As more particularly illustrated in FIG. 18, linkage mechanism 100 has a longitudinal axis 107 which forms an included angle with hub axis 22. This "angled" configuration is used in certain cases to accommodate the necessary longitudinal displacement of piston head 104 even though upstream and downstream regions 36, 38, respectively, are spherically-shaped. Linkage 100 preferably includes spherical joints generally designated as 108 thereby facilitating translating movement of piston head 104 into rotational movement of blades 24. In particular, joints 108 include a pair spherically-shaped bearing portion 110 disposed intermediate a pair of links 112 joining head 104 to blade trunnion generally designated as 114. Additional considerations that may lead to the selection of an angled linkage mechanism include a relatively small hub diameter compared to the blade periphery diameter, the number of blades which as that number increases reduces the sweep of each blade, or the location of servomotors or other components necessary to position the blades.

It is well known that the use of turbines with adjustable blades permits high efficiency output under a wide range of operating conditions, and in particular under various "net head" conditions, i.e., under conditions where the difference between the upper elevation source and lower elevation discharge region water levels varies widely. Such broad range of operating conditions typically requires automatic and simultaneous adjustment of blades 24 and wicket gates 28 in accordance with load demand. However, to allow a turbine configured with reduced gaps between the hub and the inner surface of the blades and between the outer surface of the blades and the discharge ring as herein disclosed to maintain its improved cavitation, efficiency, and fish survivability characteristics over this broad range, the turbine will be advantageously associated with control systems providing traditional governor functions and control routines.

Typically, to adjust the position of the blades and wicket gates it is necessary to sense various parameters including turbine speed, wicket gate position, blade pitch, net head, and output power, as the most characteristic ones. In the early years of Kaplan turbines, sensing of most of these parameters was done mechanically, as explained in co-pending U.S. patent application Ser. No. 08/623,245, filed Mar. 28, 1996 which is incorporated herein by reference.

Thus, and referring back to FIG. 1, a control system generally designated as 120 may advantageously be used with the various embodiments of the present invention. Control system 120 includes a plurality of sensors 122 designed to measure turbine operation and other related control parameters. The electric signals generated by sensors 122 are sent to a controller 124, preferably via signal conditioning circuits (not shown). For example, the electrical signal representative of the speed of turbine 18 is provided by a toothed disc mounted on the shaft of turbine 18; the disc is associated with two inductive sensing elements providing two independent signals to controller 120. Controller 124 may also receive an electrical signal representative of the position of wicket gate 28. Controller 124 preferably includes a digital-based processor and required analog to digital conversion and signal scaling circuits.

The information provided by the various sensors is then used in control algorithms allowing controller 124 to compute and generate various control signals, as required, for the efficient operation of installation 10, without significantly compromising the gains in the fish survivability, cavitation, and efficiency achieved by the embodiment(s) of the present invention that is (are) associated with control system 120. The control signals generated by controller 124 are then fed to a plurality of signal converters generally designated as 126. Signals from each signal converter 126 are sent in the appropriate form to associated actuators 128 (typically of the hydraulictype), used to adjust the position of blades 24 and the opening of wicket gates 28, as calculated by controller 124, for efficient operation of turbine installation 10. As a result, control system 120 provides another way, whether used alone or in combination with some of the other embodiments of the present invention, to increase fish survivability, while increasing efficiency and reducing cavitation, of an installation having a turbine of the type disclosed and claimed in this application.

Figure 6:
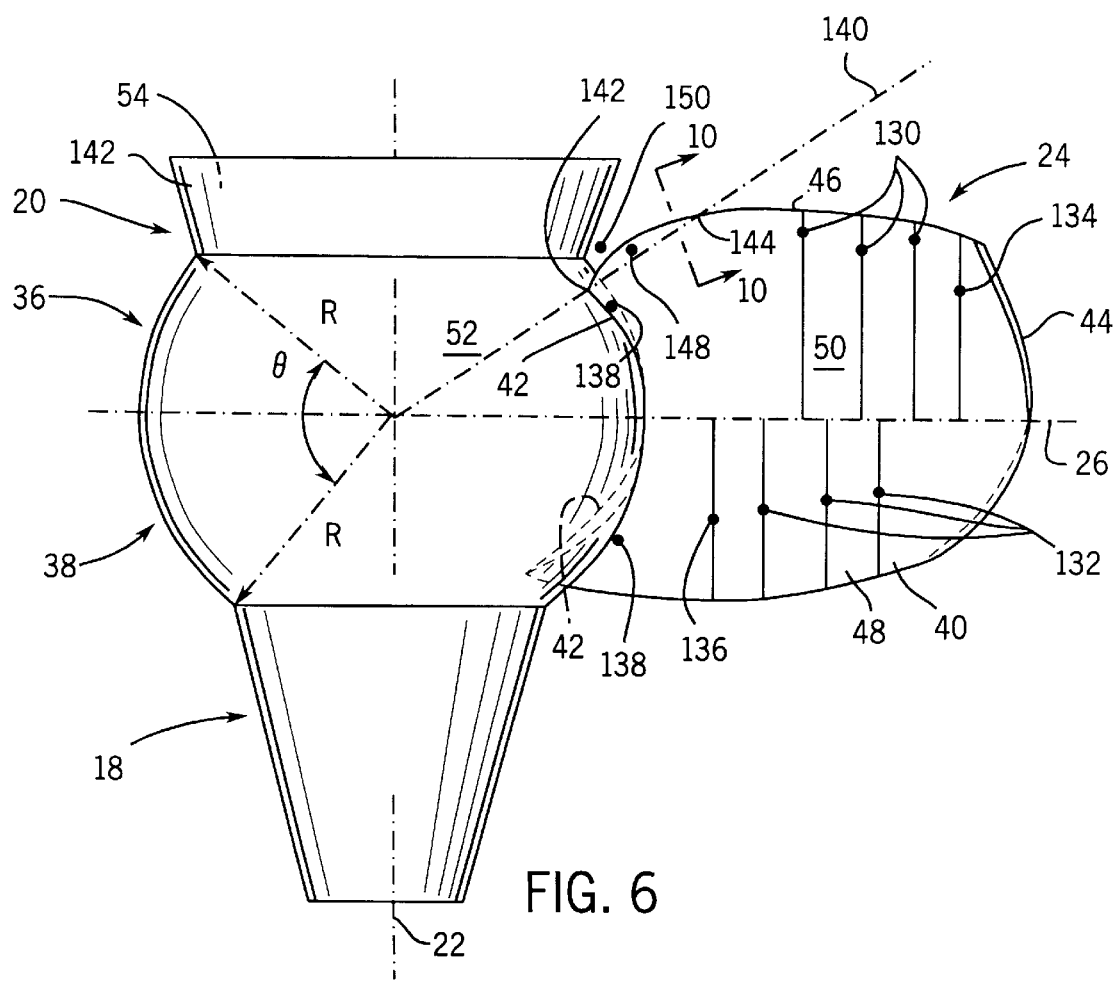
FIG. 6 is a side elevational view of a first embodiment of the hub and one associated blade in accordance with the present invention, the blade being shown at maximum pitch position.
Figure 21:
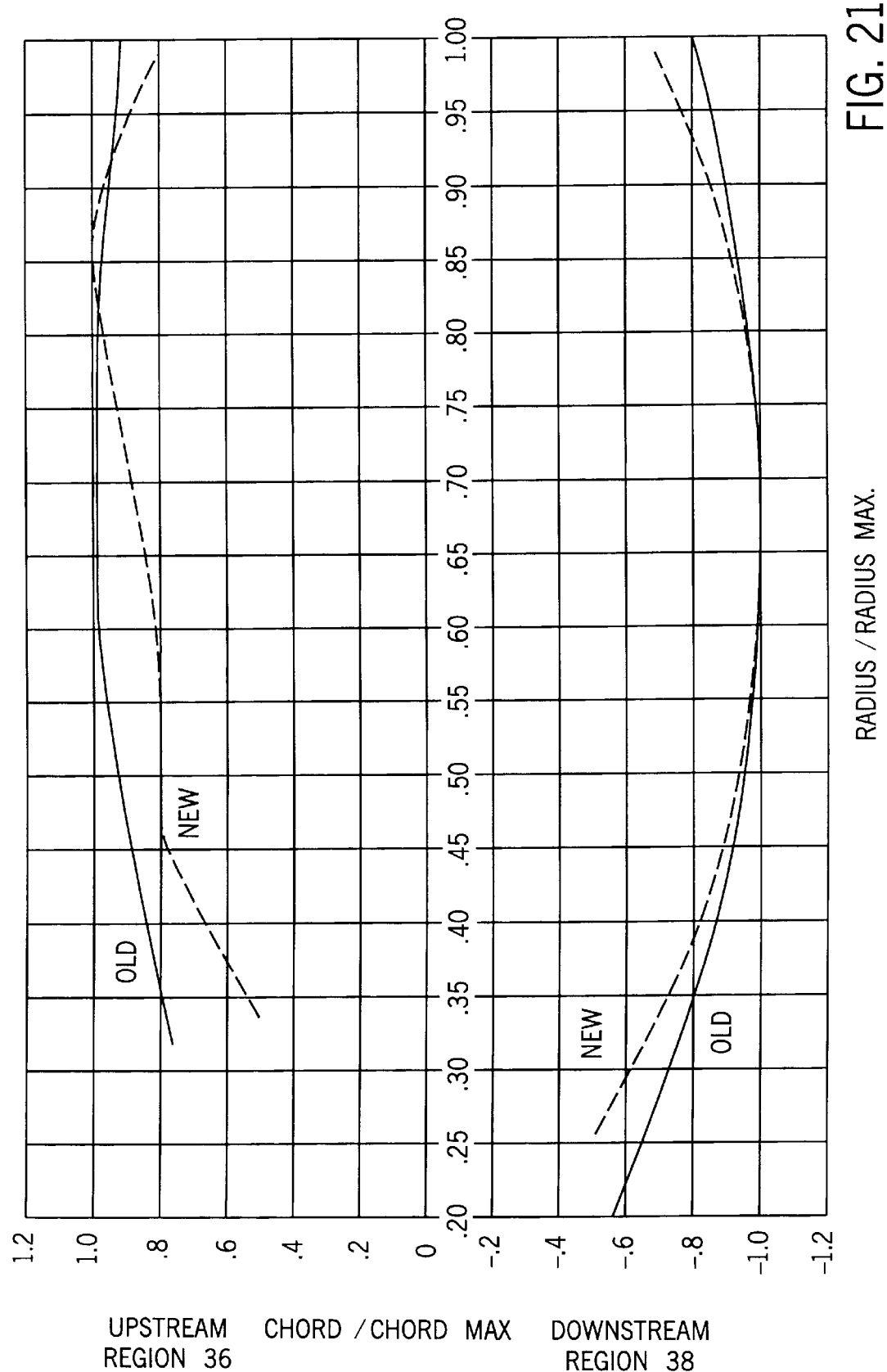
FIG. 21 is a graphical comparison between the normalized chordal distribution of a blade in accordance with another embodiment of the present and that of a prior art blade.

Turning now to a further embodiment of the present invention and referring to FIGS. 6 and 21, at times certain design considerations will not permit increasing included angle Θ formed between the two radiating lines R. In other words, it will not be possible to increase upstream and/or downstream portions 36, 38 of hub 20 to an extent sufficient to ensure that hub surface 52 swept by inner surface 42 is spherical. Accordingly, spherical hubs described in the foregoing may also be conveniently associated with blades of reduced chordal distance in the area of the root of the blade, i.e., in the region of the blade proximate the blade inner surface. However, if reducing the chordal distance of a contemplated blade design decreases undesirable gaps formed between the blades and the hub, such approach also typically reduces the effective water directing surface of the blade. As a result, to return the effectiveness of the turbine design to its original desired value, this approach may require an increase in the number of blades of the runner.

In particular and as illustrated in FIG. 6, blade 24 is characterized by an upstream chordal distribution 130 and a downstream chordal distribution 132. In upstream distribution 130, the upstream chord 134, i.e., the distance taken along a perpendicular line extending from rotational axis 26 to leading edge 46 varies from outer surface 44 to inner surface 42. Similarly, in downstream distribution 132, downstream chord 136 separating axis 26 from trailing edge 48 varies from outer surface 44 to inner surface 42. Therefore, in cases where design considerations will not permit increasing included angle Θ, another way to ensure that gaps are not formed as blades 24 depart from maximum pitch position is to have blades 24 formed with leading edge 46 extending toward blade rotational axis 26. This configuration is achieved by shortening upstream chord 134 in a root region 138 of blade 24, as shown in FIG. 21.

The effect of shortening chordal distribution 130 in root region 138 can best be understood by referring to FIG. 6 in which is shown a line 140 radiating from the hub center through the juncture 142 of leading edge 46 and inner surface 42, and continuing away from inner surface 42 to intersect leading edge 46 at a forward point 144. In other words, by extending leading edge 46 toward rotational axis 26 an area 148 is formed, area 148 being bounded by a portion of leading edge 46 extending between points 142 and 144, and by line 140. As can be readily appreciated, were leading edge 46 not extending toward axis 26 (as in prior art cases), line 140 would intersect leading edge 46 at only one point, i.e., at point 142. Conversely, the more significant the chordal reduction in root region 138 the larger area 148 will become.

Similarly, and as shown in FIG. 21, blade 24 may instead or also include a shortened downstream chord 136 in root region 138, thereby causing trailing edge 48 to extend toward rotational axis 26. In such cases, and without illustrating this similar downstream construction in the Figures, a radiating line 140' will intersect trailing edge 48 at points 142' and rearwardly at point 144'. In other words, by extending trailing edge 48 toward rotational axis 26 an area 148' is formed, area 148' being bounded by a portion of trailing edge 48 extending between points 142' and 144', and by line 140'.

As those skilled in the art will readily appreciate, shortening upstream and/or downstream chordal distances in accordance with the present invention is not restricted to certain chordal dimensions, nor is it limited to certain specific relative dimensional reductions of these distances. Accordingly and to facilitate a comparison of the chordal distribution of a blade of the present invention to that of a prior art blade, one will note that in FIG. 21 the chordal distribution has been normalized, both for the chordal distance and for the radial distance along axis 26, i.e. for any point lying between outer surface 44 and inner surface 42.

As explained above, shortening upstream chord 134 and/or downstream chord 136, in root region 138 causes blade inner surface 42 "to fall on", i.e. to lie effectively in contact with, spherical hub outer surface 52 upstream, and/or downstream, of blade rotational axis 26. As is apparent on FIG. 6, such blade configuration naturally enlarges a space 150 formed between leading edge 42 and the region of hub 20 where upstream region 36 meets the non-spherical portion 142 of hub 20. However and significantly, unlike gaps 60, enlarged space 150 will not typically materially affect the operating characteristics of the turbine, nor will it increase the propensity of the turbine to injure fish because, for hydraulic considerations, leading edge 46 will normally have a rounded profile as shown in FIG. 10.

Finally, according to yet another aspect of the present invention, spherical hubs and blades of the types described herein may also advantageously be used as part of rehabilitation and other upgrade projects to enhance certain operating characteristics of existing turbine installations. In such projects, one of the primary design considerations is to increase or at least maintain the total water directing surface area of the turbine runner so as to increase (or at least maintain) the ability of the blades to extract energy from the flow of water passing through the turbine. However, while reducing the chordal distribution in root region 138 of blade 24 effectively reduces gaps 58 and enhances certain operating characteristics of Kaplan turbines, as noted above, this approach also reduces the effective water directing surface. Accordingly, in certain rehabilitation projects it may be desirable to reconfigure turbine runner 18 by reducing the chordal distance in the root region of the blades, while increasing the number of blades to substantially maintain or preferably increase the power extraction capacity of the turbine.

Specifically, in an existing turbine having M blades pivotally connected to the hub, each blade comprising a water directing surface having an inner portion of a given chordal distance in a root region thereof. To upgrade such turbine runner, it may be desirable to replace it with a runner having N improved blades. Each improved blade having an inner portion of a reduced chordal distance in a root region thereof. To maintain or preferably increase the power extraction capacity of the turbine, N is an integer at least equal to M times the ratio of the given chordal distance to the reduced chordal distance.

In light of the foregoing, it should be understood that the above description is of preferred exemplary embodiments of the present invention, and that the invention is not limited to the specific forms described. For example, those skilled in the art will readily appreciate that blades 24 could have configurations other than those described herein provided the inner and outer surfaces of the blades cooperate with a spherically-shaped hub and/or discharge ring, respectively. In addition, seal 62 could be configured or attached to the blade in ways other than those described. Furthermore, controllers of the type associated with these improvements do not necessarily need to be of the digital processor-based type. However, all of these other constructions are, nevertheless, considered to be within the scope of this invention. Accordingly, these and any other substitutions, modifications, changes and omissions may be made in the design and arrangement of the elements and in their method of operation as disclosed herein without departing from the scope of the appended claims.

We claim:

1. A turbine installation having a flow of water passing therethrough from an upper elevation source of water to a lower elevation discharge region, the turbine installation comprising:
   a turbine disposed in the flow of water for producing electrical energy, the turbine including:
      a plurality of runner blades, each blade comprising a hydrofoil being bounded by an inner surface and a distal outer surface, a leading edge and a trailing edge separated by a water directing surface, the blades being adjustable in pitch from a maximum pitch position in which an inner portion of the water directing surface extends substantially in a direction of the water flow, to a minimum pitch position in which an outer portion of the water directing surface is substantially perpendicular to the water flow;
      a hollow hub having spaced apart inner and outer surfaces and a hub longitudinal axis, each blade being pivotally connected to the hub about a rotational axis, the outer surface of the hub swept by the inner surfaces of the blades during rotation of the blades from the maximum pitch to the minimum pitch being spherically-shaped, and the inner surfaces of the blades substantially conforming to the outer surface of the hub thereby limiting the gap formed therebetween; and
      a linkage mechanism received in the hollow hub and connecting the blades to a drive mechanism for rotation of the blades about the rotational axes, the linkage mechanism having a longitudinal axis disposed at an angle relative to the hub longitudinal axis; and
      an electrical closed-loop control system for adjusting the drive mechanism to control the pitch of the blades, the control system including a digital based processor associated with sensors selectively generating electrical signals indicative of at least turbine speed, blade pitch, and difference in elevation between the upper elevation source of water and the lower elevation discharge region.

2. The turbine of claim 1, wherein the linkage mechanism comprises a spherically-shaped linkage bearing cooperating with a link.

3. A turbine installation including a water passageway extending from an upper elevation source of water to a lower elevation discharge region, the turbine installation comprising:
   a turbine disposed in the water passageway and including:
      a hollow hub having spaced apart inner and outer surfaces and a longitudinal axis; and
      a plurality of blades, each of the blades being pivotally connected to the hub about a rotational axis extending in a direction generally perpendicular to the longitudinal axis, each of the blades having an outer surface distal from an inner surface, a leading edge and a trailing edge separated by a water directing surface, each blade having a chordal distance defined by a distance taken along a perpendicular line extending from the rotational axis to the leading edge, the chordal distance of at least one of the blades being shortened in a root region of the leading edge proximate the hub thereby causing the blade inner surface to lie effectively in contact with the hub outer surface upstream of the blade rotational axis;
      wherein each of the blades is adjustable in pitch from a maximum pitch position in which an inner portion of the water directing surface extends substantially in a direction of the water flow, to a minimum pitch position in which an outer portion of the water directing surface is substantially perpendicular to the water flow, and wherein the outer surface of the hub extending upstream of the blade rotational axis swept by the inner surfaces during rotation of the blades from the maximum pitch to the minimum pitch is spherically-shaped, and the inner surfaces oppositely facing the upstream outer surface substantially conform thereto thereby limiting a gap formed therebetween; and
      an electrical closed-loop control system for adjusting each blade in position from the maximum pitch to the minimum pitch, the control system including a digital based processor associated with sensors selectively generating electrical signals indicative of at least turbine speed, blade pitch, and difference in elevation between the upper elevation source of water and the lower elevation discharge region.

4. The turbine of claim 3, wherein the longitudinal axis and rotational axis intersect at a hub center, the trailing edge extending toward the rotational axis so that a line radiating from the hub center and passing through a juncture of the blade inner surface and the trailing edge intersects the trailing edge at a point intermediate the juncture and the outer surface.

5. The turbine of claim 3, wherein each of the blades has a downstream chordal distance defined by a distance taken along a perpendicular line extending from the rotational axis to the trailing edge, the downstream chordal distance of at least one of the blades being shortened in a root region of the trailing edge proximate the hub thereby causing the blade inner surface to lie effectively in contact with the hub outer surface downstream of the blade rotational axis, and further wherein the outer surface of the hub extending downstream of the blade rotational axis swept by the inner surfaces during rotation of the blades from the maximum pitch to the minimum pitch is spherically-shaped, and the inner surfaces oppositely facing the downstream outer surface substantially conform thereto thereby limiting a gap formed therebetween.

6. The turbine of claim 3, further comprising a linkage mechanism received in the hollow hub and connecting the blades to a drive mechanism for rotation of the blades about the rotational axes, the linkage mechanism having a longitudinal axis disposed at an angle relative to the hub longitudinal axis.

7. A turbine installation having a flow of water passing therethrough from an upper elevation source of water to a lower elevation discharge region, the turbine installation comprising:

a turbine disposed in the flow of water and including:

a hollow hub having spaced apart inner and outer surfaces and a longitudinal axis; and a plurality of blades, each of the blades being pivotally connected to the hub about a rotational axis, each of the blades having an outer surface distal from an inner surface, a leading edge and a trailing edge separated by a water directing surface each of the blades having a downstream chordal distance, being a distance taken along a perpendicular line extending from the rotational axis to the trailing edge, the chordal distance of at least one of the blades being shortened in a region of the trailing edge proximate the hub so that the blade inner surface lies effectively in contact with the hub outer surface downstream of the blade rotational axis;

wherein each of the blades is adjustable in pitch from a maximum pitch position in which an inner portion of the water directing surface extends substantially in a direction of the water flow, to a minimum pitch position in which an outer portion of the water directing surface is substantially perpendicular to the water flow, and wherein the outer surface of the hub extending downstream of the blade rotational axis swept by the inner surfaces during rotation of the blades from the maximum pitch to the minimum pitch is spherically-shaped, and the inner surfaces oppositely facing the downstream outer surface substantially conform thereto thereby limiting a gap formed therebetween; and an electrical closed-loop control system for adjusting each blade in position from the maximum pitch to the minimum pitch, the control system including a digital based processor associated with sensors selectively generating electrical signals indicative of at least turbine speed blade pitch, and difference in elevation between the upper elevation source of water and the lower elevation discharge region.

8. The turbine of claim 7, wherein the longitudinal axis and rotational axis intersect at a hub center, the leading edge extending toward the rotational axis so that a line radiating from the hub center and passing through a juncture of the blade inner surface and the leading edge intersects the leading edge at a point intermediate the juncture and the outer surface.

9. The turbine of claim 7, further comprising a linkage mechanism received in the hollow hub and connecting the blades to a drive mechanism for rotation of the blades about the rotational axes, the linkage mechanism having a longitudinal axis disposed at an angle relative to the hub longitudinal axis.

10. A hydroelectric turbine installation comprising:

a water passageway for containing turbine components and extending from an upper elevation source of water to a lower elevation discharge region, the passageway including a plurality of wicket gates adjustable in position to control water flowing therethrough;

a turbine comprising:

a. a hollow hub having spaced apart inner and outer surfaces and a longitudinal axis, the hub being disposed in the passageway to produce electrical energy by rotation of the hub from the water flowing through the passageway; and b. a plurality of blades, each blade comprising a hydrofoil being bounded by an inner surface and a distal outer surface, a leading edge and a trailing edge separated by a water directing surface, each blade being pivotally connected to the hub about a rotational axis extending in a direction generally perpendicular to the longitudinal axis so that its inner surface is proximate the hub;

a discharge ring disposed in a region of the passageway proximate the rotational axes of the blades, the ring having a face oppositely facing the outer surface of the blades; and an electrical closed-loop control system for adjusting each blade in position from a maximum pitch position to a minimum pitch position, an outer portion of the water directing surface forming a greater impediment to the water flowing through the passageway in the minimum pitch position than in the maximum pitch position;

wherein the outer surface of the hub swept by the inner surfaces of the blades during rotation of the blades from the maximum pitch to the minimum pitch is spherically-shaped, and wherein the inner surfaces of the blades substantially conform to the outer surface of the hub, thereby limiting gaps formed therebetween; and wherein each blade inner surface meets a respective water directing surface along an edge, the edge being rounded at least in a region of the inner surface extending from a respective leading edge.

11. A hydroelectric turbine installation comprising:

a water passageway for containing turbine components and extending from an upper elevation source of water to a lower elevation discharge region, the passageway including a plurality of wicket gates adjustable in position to control water flowing therethrough;

a turbine comprising:

a. a hollow hub having spaced apart inner and outer surfaces and a longitudinal axis, the hub being disposed in the passageway to produce electrical energy by rotation of the hub from the water flowing through the passageway;

b. a plurality of blades, each blade comprising a hydrofoil being bounded by an inner surface and a distal outer surface, a leading edge and a trailing edge separated by a water directing surface, each blade being pivotally connected to the hub about a rotational axis extending in a direction generally perpendicular to the longitudinal axis so that its inner surface is proximate the hub;

a discharge ring disposed in a region of the passageway proximate the rotational axes of the blades, the ring having a face oppositely facing the outer surface of the blades; and an electrical closed-loop control system for adjusting each blade in position from a maximum pitch position to a minimum pitch position, an outer portion of the water directing surface forming a greater impediment to the water flowing through the passageway in the minimum pitch position than in the maximum pitch position;

wherein the outer surface of the hub swept by the inner surfaces of the blades during rotation of the blades from the maximum pitch to the minimum pitch is spherically-shaped, and wherein the inner surfaces of the blades substantially conform to the outer surface of the hub, thereby limiting gaps formed therebetween;

wherein the control system comprises:

a plurality of sensors, the sensors selectively generating electrical signals indicative of turbine speed, blade pitch, wicket gate position, and difference in elevation between the upper elevation source of water and the lower elevation discharge region; and an electrical controller receiving and processing the electrical signals from the sensors, the controller capable of generating signals for adjusting in position the blades and wicket gates.

12. A hydroelectric turbine installation comprising:

a water passageway for containing turbine components and extending from an upper elevation source of water to a lower elevation discharge region, the passageway including a plurality of wicket gates adjustable in position to control water flowing therethrough;

a turbine comprising:

a. a hollow hub having spaced apart inner and outer surfaces and a longitudinal axis, the hub being disposed in the passageway to produce electrical energy by rotation of the hub from the water flowing through the passageway;

b. a plurality of blades, each blade comprising a hydrofoil being bounded by an inner surface and a distal outer surface, a leading edge and a trailing edge separated by a water directing surface, each blade being pivotally connected to the hub about a rotational axis extending in a direction generally perpendicular to the longitudinal axis so that its inner surface is proximate the hub;

a discharge ring disposed in a region of the passageway proximate the rotational axes of the blades, the ring having a face oppositely facing the outer surface of the blades;

an electrical closed-loop control system for adjusting each blade in position from a maximum pitch position to a minimum pitch position, an outer portion of the water directing surface forming a greater impediment to the water flowing through the passageway in the minimum pitch position than in the maximum pitch position; and a sensor generating an electrical signal indicative of density of fish present in the water:

wherein the outer surface of the hub swept by the inner surfaces of the blades during rotation of the blades from the maximum pitch to the minimum pitch is spherically-shaped, and wherein the inner surfaces of the blades substantially conform to the outer surface of the hub, thereby limiting gaps formed therebetween.

13. A hydroelectric turbine installation comprising:

a water passageway for containing turbine components and extending from an upper elevation source of water to a lower elevation discharge region, the passageway including a plurality of wicket gates adjustable in position to control water flowing therethrough;

a turbine comprising:

a. a hollow hub having spaced apart inner and outer surfaces and a longitudinal axis, the hub being disposed in the passageway to produce electrical energy by rotation of the hub from the water flowing through the passageway;

b. a plurality of blades, each blade comprising a hydrofoil being bounded by an inner surface and a distal outer surface, a leading edge and a trailing edge separated by a water directing surface, each blade being pivotally connected to the hub about a rotational axis extending in a direction generally perpendicular to the longitudinal axis so that its inner surface is proximate the hub;

a discharge ring disposed in a region of the passageway proximate the rotational axes of the blades, the ring having a face oppositely facing the outer surface of the blades; and an electrical closed-loop control system for adjusting each blade in position from a maximum pitch position to a minimum pitch position, an outer portion of the water directing surface forming a greater impediment to the water flowing through the passageway in the minimum pitch position than in the maximum pitch position;

wherein the outer surface of the hub swept by the inner surfaces of the blades during rotation of the blades from the maximum pitch to the minimum pitch is spherically-shaped, and wherein the inner surfaces of the blades substantially conform to the outer surface of the hub, thereby limiting gaps formed therebetween; and wherein the control system includes a digital-based processor controller associated with sensors selectively generating electrical signals indicative of at least turbine speed and blade pitch and difference in elevation between the upper elevation source of water and the lower elevation discharge region.

14. A method of improving at least one turbine characteristic of a group of characteristics comprising efficiency, flow turbulence, cavitation, and survivability of fish present in a flow of water passing through the turbine, the turbine including a turbine runner of the type comprising a hollow hub having a longitudinal axis and an outer surface and M blades pivotally connected to the hub, each blade having an outer surface and a distal inner surface disposed proximate the hub, a leading edge and a trailing edge separated by a water directing surface having an inner portion extending from the inner surface and an outer portion extending from the outer surface, the inner portion being of a given chordal distance in a root region proximate the inner surface, each blade being movable about a trunnion axis from a maximum pitch position, in which the inner portion of the water directing surface extends substantially in a direction of the water flow, to a minimum pitch position in which the outer portion of the water directing surface is substantially perpendicular to the water flow, each blade inner surface forming a gap with the hub outer surface, at least a portion of the gap increasing in size as the blade rotates from the maximum pitch to the minimum pitch, the method comprising the steps:

removing the turbine runner from a passageway;

positioning an improved turbine runner in the passageway so that water impinges upon water directing surfaces of the improved runner as the water passes through the passageway, the improved turbine runner comprising:

an improved hollow hub having an outer surface and a longitudinal axis; and

N improved blades pivotally connected to the improved hub about respective trunnion axes, each improved blade having an inner portion of a reduced chordal distance in a root region proximate the inner surface, N being an integer at least equal to M times de ratio of the given chordal distance to the reduced chordal distance.

15. The method of claim 14 in which the outer surface of the improved hub in regions swept by the improved blade inner surfaces are substantially spherically-shaped.

16. The method of claim 15 wherein each improved blade inner surface is substantially spherically-shaped and conforms to the outer surface of the improved hub.

17. The turbine of claim 1, wherein at least one of the blades includes a seal attached to the inner surface of the at least one of the blades, the seal being effectively in contact with the outer surface of the hub swept by the at least one of the blades as the at least one of the blades is rotated about its rotational axis.

18. The turbine of claim 1, wherein the turbine is disposed in a water passageway extending from the upper elevation source of water to the lower elevation discharge region, the passageway includes a discharge ring disposed in a region of the passageway substantially facing the rotational axes of the blades, the ring having an essentially spherically-shaped face oppositely facing the outer surface of the blades, the outer surface of the blades substantially conforming to the face of the ring as the blades are rotated about their axes thereby limiting gaps formed therebetween.

19. The turbine of claim 11, wherein at least one of the blades includes a seal attached to the inner surface of the at least one of the blades, the seal being effectively in contact with the outer surface of the hub swept by the at least one of the blades as the at least one of de blades is rotated about its rotational axis.

20. The turbine of claim 11, wherein the passageway includes a discharge ring disposed in a region of the passageway substantially facing the rotational axes of the blades, the ring having an essentially spherically-shaped face oppositely facing the outer surface of the blades, the outer surface of the blades substantially conforming to the face of the ring as the blades are rotated about their axes thereby limiting gaps formed therebetween.

21. The turbine of claim 13, wherein at least one of the blades includes a seal attached to the inner surface of the at least one of the blades, the seal being effectively in contact with the outer surface of the hub swept by the at least one of the blades as the at least one of the blades is rotated about its rotational axis.

22. The turbine of claim 13, wherein the passageway includes a discharge ring disposed in a region of the passageway substantially facing the rotational axes of the blades, the ring having an essentially spherically-shaped face oppositely facing the outer surface of the blades, the outer surface of the blades substantially conforming to the face of the ring as the blades are rotated about their axes thereby limiting gaps formed therebetween.

23. The method of claim 14, further comprising the step of attaching a seal respectively to the inner surface of each improved blade, the seal remaining effectively in contact with the outer surface of the improved hub when the blades are rotated about the trunnion.

24. The method of claim 14 wherein the turbine further comprises a discharge ring disposed in a region of the passageway proximate the rotational axis of the blades, the ring having an essentially spherically-shaped face oppositely facing and substantially conforming to the outer surfaces of the blades as the blades are rotated about their axes thereby limiting gaps formed therebetween.

* * * * *